UNITED STATES PATENT OFFICE.

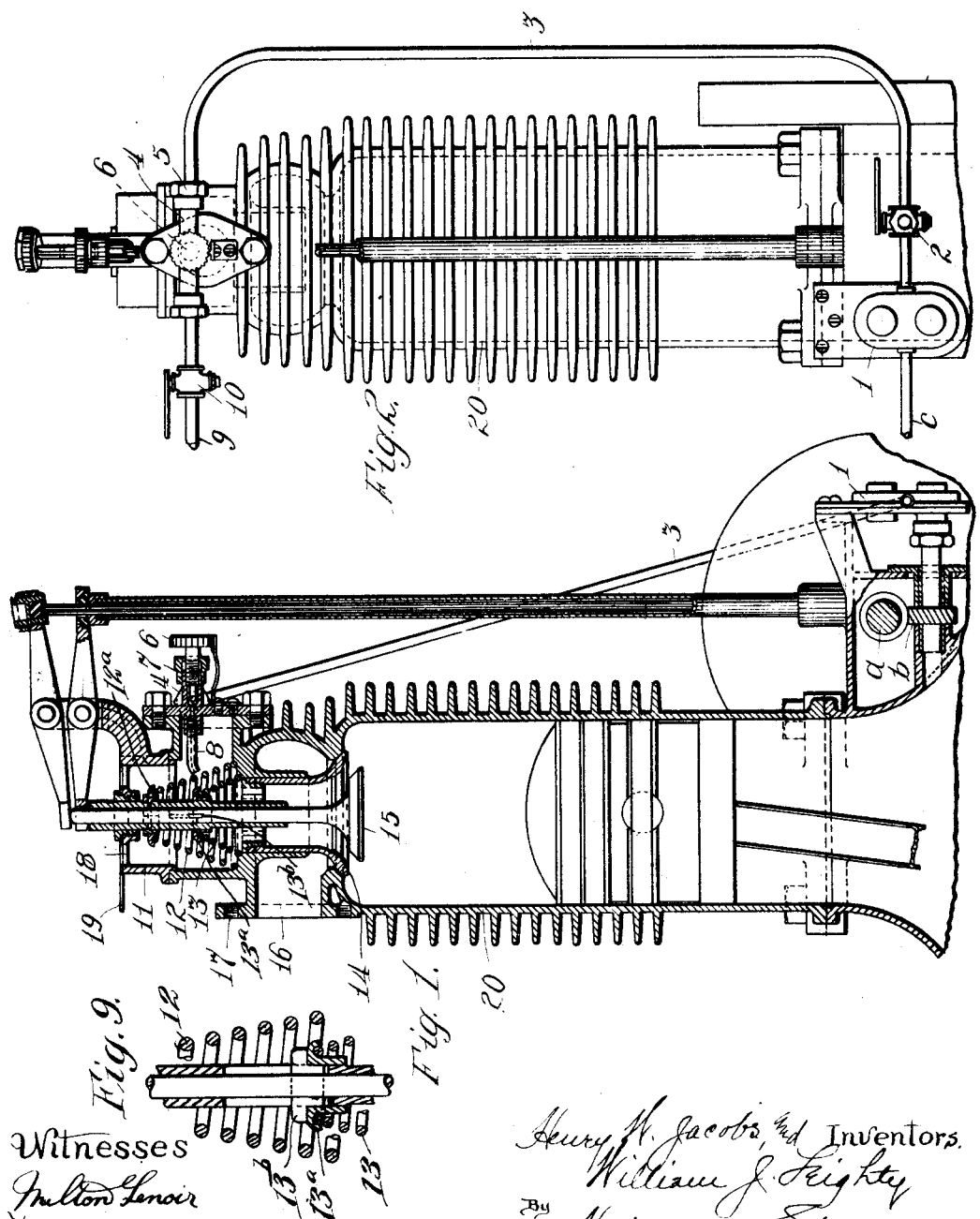

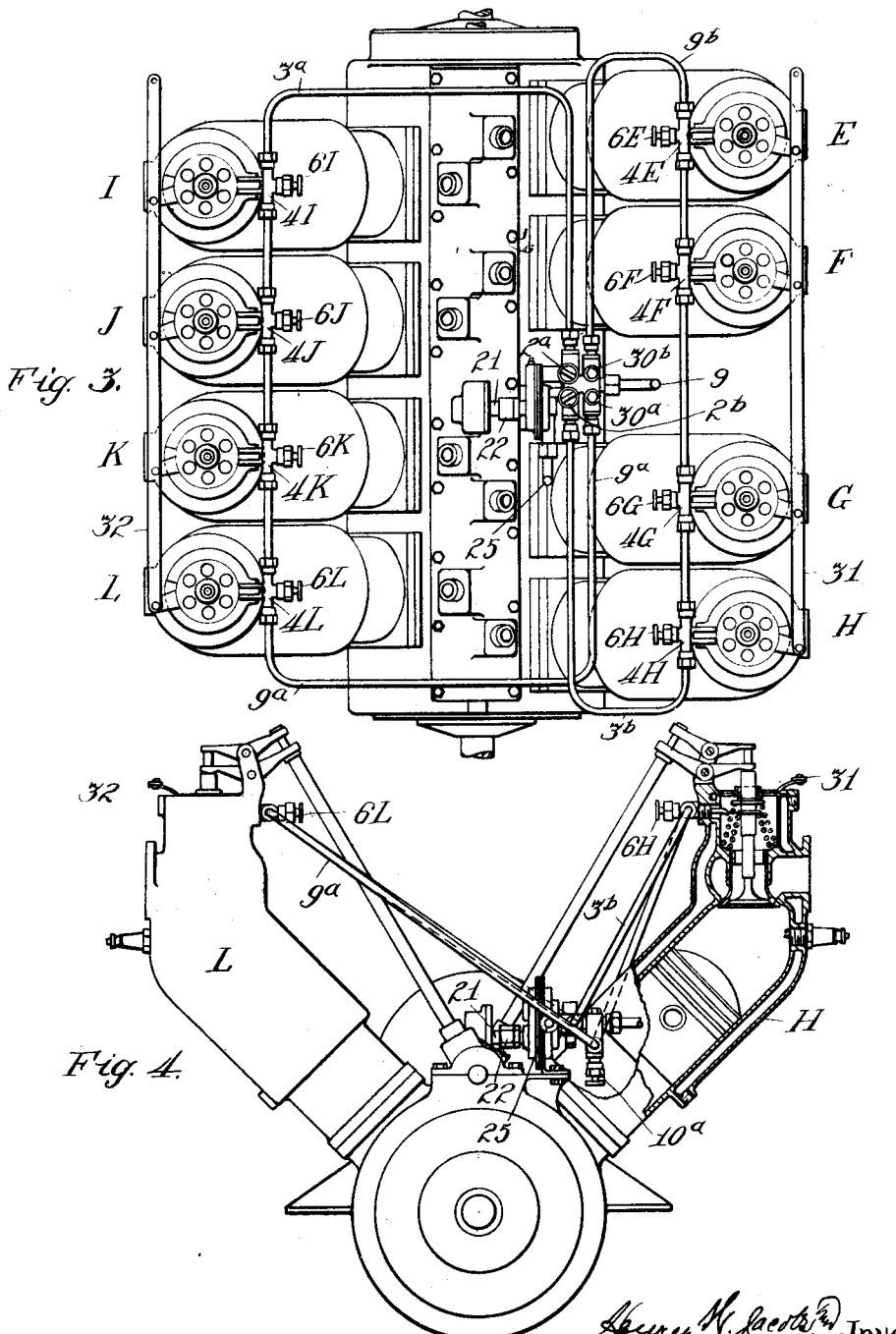

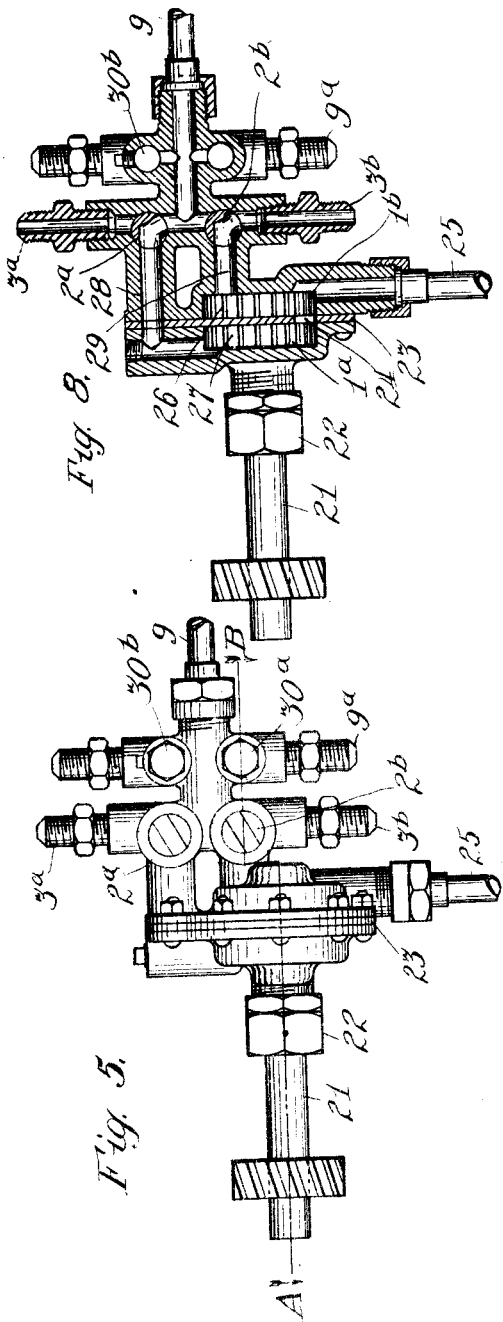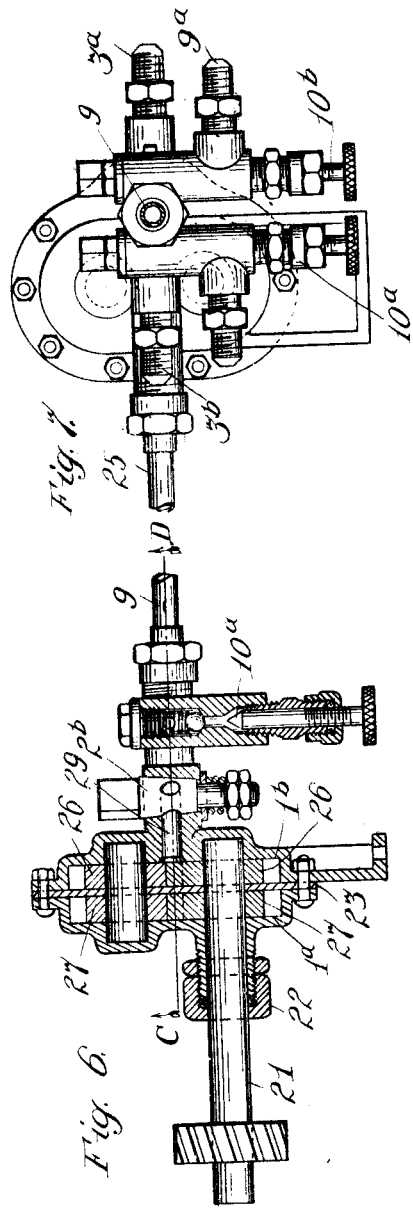

HENRY W. JACOBS AND WILLIAM J. LEIGHTY, OF TOPEKA, KANSAS.

MEANS FOR DIRECT INJECTION OF FUEL INTO AN INTERNAL-COMBUSTION MOTOR.

1,193,899. Specification of Letters Patent. Patented Aug. 8, 1916.

Application filed April 11, 1912. Serial No. 690,097.

*To all whom it may concern:*

Be it known that we, HENRY W. JACOBS and WILLIAM J. LEIGHTY, citizens of the United States, and residents of Topeka, in the county of Shawnee and State of Kansas, have invented a certain new and useful Improvement in Means for Direct Injection of Fuel Into an Internal-Combustion Motor, of which the following is a description, reference being had to the accompanying drawings, which form a part of our specification.

Our invention relates to means whereby the fuel used in an internal combustion motor will be directly injected therein, and whereby the fuel injected will be so affected as to produce the desired effect, and yet at the same time permit of the absolute control of the fuel and the means whereby it is affected.

The object of our invention is to provide means whereby the hydrocarbon, liquid or gaseous fuel may be introduced into the cylinder of an internal combustion motor without the aid of a carbureter, and which will be economical, simple in construction, and at the same time possess the advantages of a carbureter; the means devised permitting of such adjustment so as to give the widest or greatest possible range of explosive mixtures obtainable from the fuel used.

Another object of our invention is to provide means whereby the injection of fuel to each cylinder of a multi-cylindered motor or motors may be individually adjusted so as to insure the maximum and at the same time an even development of power in each cylinder; the invention permitting of a better regulation of fuel and air to each individual cylinder than it is possible to obtain with a carbureter.

A further object of our invention is to provide means whereby the fuel supply to the individual cylinders of a multi-cylindered motor, or motors, may be controlled or cut off from all or a number of the cylinders in order to economize in fuel when the motor is allowed to "drift" or where only a fraction of the total power of the motor is required.

Other advantages inherent in the invention will be made apparent from the following detailed description of the construction shown in the drawings, wherein:—

Figure 1 is a longitudinal sectional view of an air cooled internal combustion motor cylinder showing the means for injecting the liquid fuel or hydrocarbon. Fig. 2 is a side elevation of the construction shown in Fig. 1, with a portion of the valve operating mechanism shown broken away. Fig. 3 is a plan view of a multi-cylindered motor in the form of an eight-cylinder V-type water cooled internal combustion motor illustrating the adaptation of our invention to a motor of this type. Fig. 4 is an end elevation of the construction shown in Fig. 3, looking at the motor from the end adjacent to Fig. 4, with one side or cylinder being shown in partial longitudinal section. Fig. 5 is an enlarged detail or plan view of the fuel pump employed on the motor shown in Figs. 3 and 4. Fig. 6 is a cross sectional view taken on the line A—B of Fig. 5, looking in the direction of the arrow. Fig. 7 is an end view of the fuel pump shown in Fig. 5, looking at the same from the return pipe side. Fig. 8 is a cross sectional view taken on the line C—D of Fig. 6, looking in the direction of the arrow. Fig. 9 is a detail view of the springs and their connections with the exhaust valve and intake valve stems; the springs and exhaust valve stem being shown in section; said stems being turned through ninety degrees from that shown in Fig. 1.

The purpose of our invention is to provide means whereby a system of injection or admission of the liquid or gaseous fuel into the cylinder or cylinders of an internal combustion motor will be obtained in a simple and economical manner, while at the same time providing adjustment which will result in the widest possible range of explosive mixtures obtainable from the fuel used.

As exemplification of our invention, we have shown the same applied to different types of motors; for example, in Figs. 1 and 2, the invention is shown applied to the simplest type of motor, that is, a motor having but one cylinder.

Referring to the construction illustrated in Figs. 1 and 2, the system will be seen to consist of a liquid fuel pump 1, which is driven by any positive means operated by the motor, preferably from the cam shaft $a$ through reduction gearing as at $b$, see Fig. 1. The pump is supplied by the supply pipe $c$ from any suitable source, and is provided with a feed line or pipe 3 which is provided at a suitable point with a three-way or by-pass valve as at 2, which serves as a fuel cut-out when it is turned so as to deliver the fuel supplied by the pump 1 back to the tank or source of supply instead of through the feed line 3, leading to the motor, when it is desired to let the motor "drift." The feed pipe or feeder line 3 connects at its other end with a T connection 4 by means of a union 5.

The T connection 4 is provided with a needle valve 6, see Fig. 1, whereby the liquid fuel passing through the T connection is regulated so that the amount of fuel injected into the motor may be controlled. In order to prevent a waste of fuel, we provide the needle valve with a suitable gland packing as at 7. The T connection 4 is suitably connected to the side of the mixing chamber, and is provided on the inner side with a delivery tube 8, through which the fuel is introduced into the mixing chamber.

The end of the T connection opposite to that to which the feeder line 3 is connected, is provided with a return line or pipe 9 whereby the excess of fuel passing through the connection is returned to the reservoir or source of supply. The return line 9 is provided with a back pressure valve 10, which serves as an auxiliary control of the fuel supply through its action in regulating the pressure in the feeder line 3.

The end of the cylinder is provided with a mixing chamber 11, which also houses the mechanism whereby the intake and exhaust valves are restored to normal position.

In the construction illustrated, we provide separate springs for the intake and the exhaust valves; the two springs 12 and 13 being concentrically arranged in the mixing chamber 11 and controlling the exhaust and intake valves respectively. The exhaust valve 14 is slidably mounted in an extension of the mixing chamber, with the intake valve 15 concentrically arranged within the exhaust valve, as clearly shown in Fig. 1.

The lower ends of the springs bear against the lower wall of the mixing chamber, while the other ends of the springs bear against the collars fitted about the exhaust valve stem. The collar 12ᵃ against which spring 12 bears, is fixedly secured to the exhaust valve stem, while collar 13ᵃ is slidably mounted on the exhaust valve stem; said valve stem being provided with a slot for the reception of a pin or key 13ᵇ, which latter extends through the intake valve stem and engages with the collar 13ᵃ; the arrangement being such that sufficient play between the pin 13ᵇ and the slot in the exhaust valve stem is obtained to permit movement of the intake valve independently of the exhaust valve. It is evident therefore, that spring 13 controls the action of the intake valve while spring 12 controls the action of the exhaust valve.

With the delivery tube 8 extending in proximity to the outer or exhaust spring 12, it is evident that the liquid fuel will be fed onto the spring, and by reason of its capillarity will flow or follow along the coils of the spring to the bottom of the mixing chamber. With the springs arranged in the form of conical spirals, it is evident that the liquid fuel will be distributed around the base of the mixing chamber.

From the construction shown and described, it will be seen that as the exhaust valve 14 opens, the exhaust gases will be allowed to pass the seat of the valve and out through the discharge orifice 16, into the atmosphere, or into a suitable exhaust pipe which may be secured at the orifice 16 to the flange coupling 17. As the hot gases escape, they tend to heat the wall of the hollow exhaust valve as well as the walls between the exhaust port 16 and the mixing chamber 11.

When the exhaust valve returns to its seat, it closes with a slight shock which causes a slight tremulous vibration in the exhaust spring 12. The vibration of the spring jars any liquid fuel that still adheres to the spring compelling it to drop toward the lower part of the mixing chamber in the form of minute globules, or a spray, which mix with the inrushing air allowed to enter through the perforations or openings 18 in one end of the mixing chamber, thus allowing every globule to become properly oxidized. The air admitting perforations or openings 18 are opened or closed by a perforated disk 19 arranged at the end of the mixing chamber, thus enabling the air supply to be regulated.

By arranging the valves concentrically, and which we believe to be the preferable construction, special advantages are afforded in the uniform cooling of the exhaust valve by the intake charge; the exhaust valve in turn radiates its excess heat into the intake charge and thereby effects a more perfect vaporization.

The intake valve 15 opens instantly after the exhaust valve 14 closes, and the minute oxidized globules of the liquid fuel pass through the hot passage, formed by the exhaust valve, into the cylinder 20, where it is compressed and exploded in the usual manner common to the four-cycle type of internal combustion motors. The intake valve 15 is returned to its seat through the action of its own spring 13, so that the exhaust valve spring 12 is relieved of any excess or heavy duty.

In Figs. 3 and 4, we illustrate our improved system of liquid fuel injection applied to an eight-cylinder V-type of motor; the cylinders in these figures being of the water cooled type instead of the air cooled type illustrated in Figs. 1 and 2, which, however, in no way affects the application of our invention. In the construction of motor shown in these figures, our improved method or system is so arranged as to permit of the operation of cylinders E, F, G, and H, independent of cylinders I, J, K, and L, and vice versa; or permit of the operation of all the cylinders simultaneously, or cutting out all of the cylinders at the same time. In this application of our system, the fuel pump employed is a double one, and preferably has the by-pass and back pressure valves built integral with it, for the sake of simplicity and convenience.

The pump is more clearly illustrated in Figs. 5, 6, 7, and 8, wherein the preferable construction is shown in the nature of two geared pumps as illustrated in the cross section of the double pump in Fig. 6; although the same may be constructed in any suitable manner. These pumps are preferably driven off the cam shaft by a set of reduction gears connected to the shaft 21, which passes through a suitable gland 22 preferably formed integral with the one side of the pump. The pump is provided with the two pump chambers $1^a$ and $1^b$, which are separated from each other by a suitable plate 23. The separating plate 23 is provided with an opening or perforation 24, see Fig. 8, whereby communication between the two chambers $1^a$ and $1^b$ may be had. The feeder or supply pipe 25, in Figs. 5 and 8, is directly connected to the pump chamber $1^b$, see Fig. 8, in which chamber the gears 26, 26, are located; and the supply passes from chamber $1^b$ through the orifice 24, in separating plate 23, into chamber $1^a$, in which chamber are located the gears 27, 27, see Fig. 6. The liquid fuel is discharged from chamber $1^a$, through the passage 28, see Fig. 8, to the three-way valve $2^a$, which communicates with a feeder pipe or line $3^a$ when in one position, or with a return pipe 9 when in a second position. The three-way valve $2^a$ is shown in Fig. 8 moved into position so as to carry or discharge the fuel into the return pipe 9 instead of into the feeder pipe or line $3^a$. The liquid fuel discharged from pump chamber $1^b$ is delivered through the passage 29 which connects with the three-way valve $2^b$, and this valve $2^b$ communicates with feeder pipe or line $3^b$ when in one position, or with the return pipe or line 9 when in a second position. The three-way valve $2^b$, in Fig. 8, is set to deliver the fuel into the feeder pipe or line $3^b$.

Referring to Fig. 3, it will be seen that the fuel supply discharged from the pump chamber $1^b$ into feeder line or pipe $3^b$ will pass through the delivery or T connections $4^H$, $4^G$, $4^F$, and $4^E$, while the excess liquid fuel will return through the return pipe or line $9^b$ to the back pressure valve $10^b$ (which is located to the rear of back pressure valve $10^a$ in Fig. 4 and is of similar construction) from whence it passes through a check valve $30^b$ (also similar in construction to check valve $30^a$ see Figs. 6 and 8) into the return pipe 9, (with which both valves $30^a$ and $30^b$ communicate) see Fig. 8, which pipe carries it back to the supply tank or reservoir. The fuel supply from chamber $1^b$ can of course be controlled by the three-way valve $2^b$ so as to compel it to discharge into return pipe 9 in the same manner as shown in connection with the fuel supply from chamber $1^a$, thus cutting off the entire motor when both valves $2^a$ and $2^b$ are turned into the position of valve $2^a$, shown in Fig. 8. On the other hand, the fuel supply to the three-way valve $2^a$, could be discharged through supply line or feeder pipe $3^a$, which, in Fig. 3, is shown supplying cylinders L, K, J, and I, while the excess fluid passes back through the return line $9^a$, in Fig. 3, to the back pressure valve $10^a$ and through the check valve $30^a$ into the return pipe 9, with which it communicates, see Fig. 8, and thence back to the supply tank or reservoir.

With the system just described, it will be seen that the following conditions may exist; viz., first, all of the cylinders can be supplied with fuel; second, the four cylinders to the right of Fig. 3 may only be supplied with fuel; third, the four cylinders to the left of Fig. 3 may only be supplied with fuel; fourth, the fuel supply to all of the cylinders may be cut off.

As illustrated in Fig. 3, every one of the eight cylinders has its own individual adjustment through the needle valves $6^E$, $6^F$, $6^G$, $6^H$, $6^I$, $6^J$, $6^K$, and $6^L$.

The air supply controlling mechanism of the respective mixing chambers of the cylinders E, F, G, and H, is controlled by the rod 31, while the controlling mechanism of the mixing chamber of cylinders I, J, K, and L, may be controlled by rod 32; and these rods may be extended or so connected as to be within reach of the operator. With this arrangement, it is possible to obtain better regulation of the liquid or gaseous fuel and air in the different individual cylinders than would be possible with the employment of a carbureter, and therefore greater economy and power is insured.

We have shown and described what we believe to be the simplest and best form of our invention, and have shown its application to certain types of motors, but the mechanism may be varied in certain details, and the method may be varied in certain respects, adapting it to engines of various types, without, however, departing from the spirit of our invention; and we do not wish, therefore, to be understood as limiting ourselves to the exact construction and arrangement shown and described, but

What we claim and wish to secure by Letters Patent, is:—

1. The herein described fuel injecting means for an internal combustion motor provided with inlet and exhaust valves, which comprises a liquid fuel pump having connection with the fuel supply reservoir or tank, means whereby the fuel is conveyed from the pump to the point of injection into the cylinder and excess fuel returned to the reservoir, means intermediate of said first mentioned means and the mixing chamber whereby a predetermined quantity of fuel is injected into said chamber, and means located within the chamber, intermediate of the injecting means and the admission port of the cylinder, arranged to receive the injected fuel, said means being adapted to receive vibratory movements through the closure of the exhaust valve, whereby the fuel injected is broken up into globules or a spray.

2. The herein described fuel injecting means comprising a liquid fuel pump which has connection with the fuel supply, means whereby the fuel is conveyed from the pump to the point of injection into the cylinder and excess fuel returned to the fuel supply, means intermediate of the mixing chamber of the cylinder and the first mentioned means whereby the fuel is injected into said chamber, means whereby pressure in the supply connection from the pump to the chamber is controlled, and means located within the chamber intermediate of the injecting means and the admission port of the cylinder, arranged to receive the injected fuel, said means being adapted to receive vibratory movements through the closure of the exhaust valve, whereby the fuel injected is broken into globules or a spray.

3. The herein described fuel injecting means for an internal combustion motor provided with inlet and exhaust valves, comprising a liquid fuel pump having connection with the fuel supply reservoir, means whereby the fuel is conveyed from the pump to the point of injection into the cylinder and excess fuel returned to the reservoir, means whereby the fuel is injected into said mixing chamber, means for regulating the amount of fuel injected, and means located within the chamber intermediate of the injecting means and the admission port of the cylinder, arranged to receive the injected fuel, said means being adapted to receive vibratory movements through the closure of the exhaust valve, whereby the fuel injected is broken into globules or a spray.

4. The herein described fuel injecting means for an internal combustion motor having intake and exhaust valves, comprising a liquid fuel pump having connection with a liquid fuel supply and with the mixing chamber of a cylinder, a return line intermediate of said pump and fuel supply, a three-way valve in the connection between the pump and said mixing chamber and communicating with said return line whereby the course of the fuel may be determined, means whereby the fuel is injected into said mixing chamber in a predetermined quantity, and means located within said mixing chamber intermediate of the injecting means and the admission port of the cylinder, arranged to receive the injected fuel, said means being adapted to receive vibratory movements through the closure of the exhaust valve whereby the injected fuel is broken up into globules or a spray.

5. The herein described fuel injecting means for an internal combustion motor provided with intake and exhaust valves comprising a liquid fuel supply adapted to have connections with the mixing chambers of the motor, means located in said connections and intermediate of the supply and the mixing chambers of the cylinders whereby the liquid fuel may be alternately conveyed to the cylinders or returned to the supply, means whereby the liquid fuel in said fuel supply connections is put under pressure and the excess of fuel returned to said supply, and means within the mixing chambers of the cylinders intermediate of the injecting means and the admission port of the cylinder, arranged to receive the injected fuel, said means being adapted to receive vibratory movements through the closure of the exhaust valve whereby the injected fuel will be intermittently broken up into minute globules or a spray.

6. The herein described fuel injecting means for an internal combustion motor provided with intake and exhaust valves, comprising a liquid fuel supply, means intermediate of said supply and the mixing chambers of the cylinders whereby the liquid fuel may be alternately conveyed to the cylinders or returned to said supply, means whereby the liquid fuel in the first mentioned means is put under pressure and the excess fuel returned to said supply, means within the mixing chambers of the cylinders intermediate of the conveying means and the admission port of the cylinder, arranged to receive the injected fuel, said means being adapted to receive vibratory movements through the closure of the exhaust valve whereby the injected liquid fuel will be intermittently broken up into minute globules or a spray, and means whereby a predetermined quantity of air is admitted to said mixing chambers and the globules or spray vaporized.

7. The herein described fuel injecting means for an internal combustion motor provided with intake and exhaust valves, comprising a liquid fuel supply, means intermediate of the supply and the mixing chambers of the cylinders whereby the liquid fuel may be alternately conveyed to the cylinders or returned to said supply, means located beyond the point of connection between the first mentioned means and the cylinders whereby the liquid fuel in the first mentioned means is put under pressure and the excess fuel returned to the supply, and means located within the mixing chambers of the cylinders intermediate of the conveying means and the admission port of the cylinder, arranged to receive the injected fuel, said means being adapted to receive vibratory movements through the closure of the exhaust valve whereby the injected liquid fuel will be broken into globules or a spray substantially simultaneous with the seating of the exhaust valve.

8. The herein described fuel injecting means for an internal combustion motor provided with intake and exhaust valves for injecting fuel into the mixing chambers of a multi-cylindered motor, comprising a fuel pump having connection with a source of fuel supply and with the mixing chambers of the respective cylinders, a by-pass valve located intermediate of the pump and the mixing chambers whereby the course of the fuel discharged by the pump may be determined, means for determining the quantity of liquid fuel injected into the mixing chambers of the respective cylinders, means located within the mixing chambers of the respective cylinders for receiving the injected fuel and operable by the closure of the exhaust valves whereby the injected fuel is broken into minute particles, and means whereby a predetermined quantity of air may be admitted to the mixing chambers of the respective cylinders.

9. The herein described means for the direct injection of fuel into the cylinders of a motor provided with intake and exhaust valves, comprising a liquid fuel pump, a feed line intermediate of the pump and the respective cylinders, means whereby a predetermined quantity of fuel may be injected into the mixing chambers of the respective cylinders, means located within the mixing chambers and operable by the closure of the exhaust valves whereby the injected fuel will be broken into minute particles, and means whereby the quantity of air admitted to the different mixing chambers of the respective cylinders may be simultaneously controlled.

10. The herein described means for the direct injection of liquid fuel for a multi-cylindered motor, comprising a liquid fuel supply, a multiple liquid fuel pump, feed lines intermediate of said pump and the mixing chambers of the respective cylinders, means whereby the liquid fuel discharged by the pump may be shut off from a portion or all of said cylinders and the surplus fuel conveyed back to the fuel supply, means whereby the quantity of fuel injected into the mixing chamber of every cylinder may be determined, and means located within the respective mixing chambers whereby the injected fuel will be distributed in minute particles.

11. The herein described means for the direct injection of fuel for a multi-cylindered motor provided with intake and exhaust valves, comprising a pump driven by said motor, means intermediate of the discharge orifices of the pump and the mixing chambers of the respective cylinders for conveying the liquid fuel to the cylinders, said means being arranged to alternately convey the fuel to the cylinders or to the source of fuel supply, means located within the mixing chambers of the respective cylinders and operable by the closure of the exhaust valves whereby the liquid fuel is distributed in minute particles, and means for simultaneously controlling the admission of air to the mixing chambers of the respective cylinders.

12. The herein described means for the direct injection of fuel for a multi-cylindered motor, comprising a liquid fuel supply multiple liquid fuel pump driven by said motor, means intermediate of the discharge orifices of the pump and the mixing chambers of the cylinders whereby liquid fuel is conveyed to said cylinders, means whereby the fuel discharged by the pump may be shut off from a portion or all of said cylinders, and the surplus fuel conveyed back to the fuel supply means whereby the liquid fuel in its path to the cylinders may be put under pressure, means located within the mixing chambers of the respective cylinders for distributing the injected fuel in minute particles, and means whereby the admission of air to the mixing chambers of all or a portion of the cylinders may be controlled.

13. The herein described fuel-injecting means for an internal combustion motor, provided with a mixing chamber and concentric inlet and exhaust valves independently closed by concentric springs located in the mixing chamber of the motor, a liquid fuel pump having connection with a fuel supply, means whereby the fuel is conveyed from the pump to the mixing chamber of the cylinder and excess fuel returned to the supply, and means for injecting the fuel onto a spring in the mixing chamber whereby the fuel is broken into globules or a spray by the vibratory movement of the spring resulting from the closing of the exhaust valve.

14. The herein described fuel-injecting means for an internal combustion motor, provided with a mixing chamber and spring-controlled concentric intake and exhaust valve located in the mixing chamber of the motor, a liquid fuel pump having connection with the fuel supply and with the mixing chamber of the cylinder, means for injecting the fuel onto the spring of the exhaust valve whereby the fuel is broken into globules or a spray by the vibratory movement of said spring resulting from the closure of the exhaust valve and permitted to pass into the cylinder with the inrushing air past the intake valve.

15. The herein described fuel-injecting means for an internal combustion motor, provided with a mixing chamber and spring-controlled concentric inlet and exhaust valves, the exhaust valve being provided with a hollow vertical stem adapted to constitute a portion of the mixing chamber, a liquid fuel pump having connection with the fuel supply, means whereby the fuel is conveyed from the pump to the mixing chamber and excess fuel returned to the supply, and means whereby the fuel is injected onto the spring of the exhaust valve whereby the fuel is broken into globules or a spray through the vibratory movement of the spring resulting from the closure of the exhaust valve.

HENRY W. JACOBS.
WILLIAM J. LEIGHTY.

Witnesses:
 FRANK MITCHELL,
 H. LARIMER.